(No Model.)
J. M. DODGE.
CONVEYING MACHINE.
No. 357,145. Patented Feb. 1, 1887.
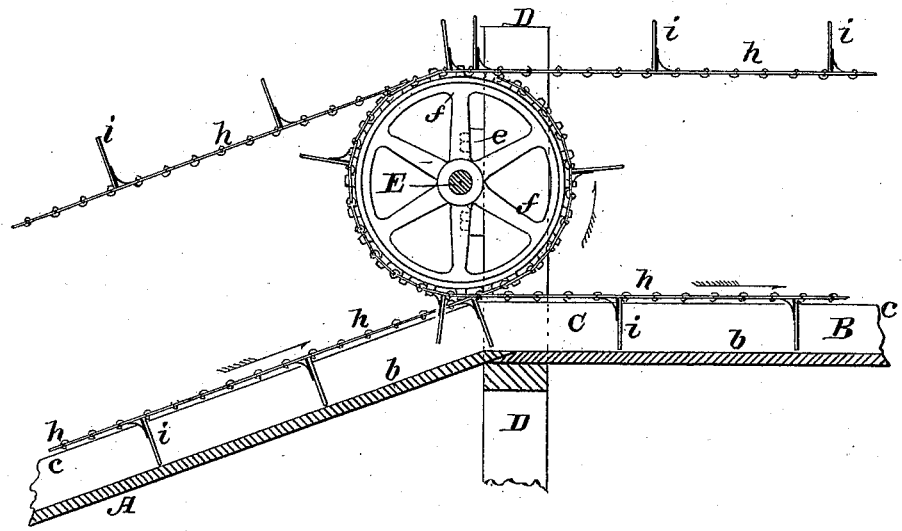
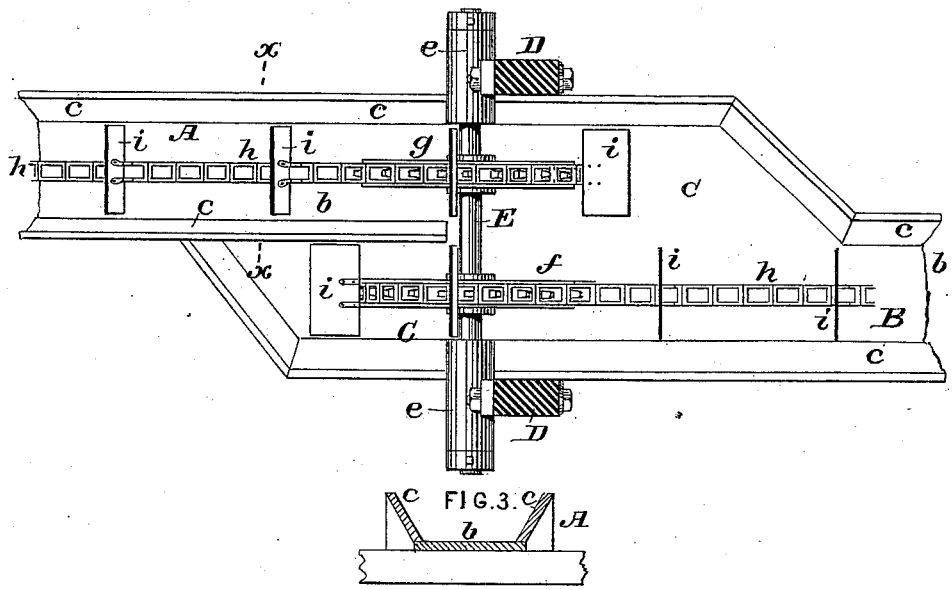
WITNESSES:
J. Henry Kaiser
Harry D. Amer
INVENTOR
James M. Dodge
J. N. McIntire
ATTORNEY

United States Patent Office.

JAMES M. DODGE, OF PHILADELPHIA, PENNSYLVANIA.

CONVEYING-MACHINE.

SPECIFICATION forming part of Letters Patent No. 357,145, dated February 1, 1887.

Application filed October 28, 1886. Serial No. 217,431. (No model.)

*To all whom it may concern:*

Be it known that I, JAMES M. DODGE, of Philadelphia, in the county of Philadelphia and State of Pennsylvania, have invented a new and useful Improvement in Conveying-Machines; and I do hereby declare that the following is a full, clear, and exact description thereof, reference being had to the accompanying drawings, making part of this application.

My invention relates to that type of conveying machines or apparatus which are designed to convey or transmit the material by means of flights or carriers working in troughs, and first in an upwardly oblique direction and thence over a level or in a horizontal direction.

Previous to my invention it has been customary to make conveying-machines for doing this class of work with a trough running obliquely upward and thence over in a horizontal position, and a conveyer-chain provided with the usual flights arranged to run first obliquely upward and thence off horizontally correspondingly with the directions in which the troughs might run in which the flights of the conveyer-chain were to work; but in all such contrivances more or less objection has existed on account of the difficulties in making the chain travel in the two different lines or planes to match those of the conveyer-trough. The upper run of chain has been usually passed over some sort of idler at the angle or bend in the direction of travel of the chain, while the lower run has been similarly supported; but serious practical difficulties are encountered in attempting to successfully work the chains and flights in this manner.

I have discovered, by experiment and practice, that by having the horizontal line of troughing and the obliquely-ascending trough communicate with a common receptacle having its bottom on a level with that of the horizontal trough, and so arranging the ascending and horizontal troughs out of line as that the material brought up in the ascending trough will accumulate in the common receptacle, and as piled up therein will tumble or slide laterally within said receptacle, two separate conveyer-chains and sets of flights having their adjacent termini at the same locality may be made to operate successfully to transport the material upwardly in the ascending trough and thence off in the horizontal trough, the construction and operation of the whole contrivance being not only perfectly efficient, but much more desirable than that of contrivances such as heretofore made.

My invention may be said to consist, essentially, in the use, in connection with an ascending and a horizontal trough communicating at their adjacent ends with a common receptacle, of two sets or runs of carrier-chains and flights having their adjacent ends passing over chain-wheels arranged with their axis in line, or side by side, and immediately over the common receptacle with which the ascending and horizontal troughs of the conveyer-chain communicate, in such manner that the material run up by the ascending run of conveyers will tumble or slide by gravity laterally and sufficiently to be further moved on into and through the horizontal trough by a separate run of chain and an independent set of flights, all as will be hereinafter more fully explained.

To enable those skilled in the art to which my invention relates to make and use conveyer apparatus embracing my improvement, I will now proceed to more fully explain the latter, referring by letters of reference to the accompanying drawings, which form part of this specification, and in which I have represented my invention carried out in that form in which I have so far successfully practiced it, and which is the best form now known to me.

In the drawings, Figure 1 is a partial sectional elevation of so much of a conveyer-machine (of the given type) as it is necessary to show for the purpose of illustrating my invention. Fig. 2 is a plan or top view of the contrivance shown in Fig. 1. Fig. 3 is a detail cross-section at the line $x\ x$ of Fig. 2, for the purpose of showing merely the sectional form of each of the conveyer-troughs.

In the several figures the same part will be found designated by the same letter of reference.

A represents portion of an obliquely-ascending conveyer-trough, preferably of the form (in cross-section) shown at Fig. 3, and composed, as seen, of a bottom, $b$, and flaring sides $c\ c$, while B is part of a similarly-constructed conveyer-trough, arranged, however, in horizontal plane at a level about coincident with the uppermost portion or end of the ascending trough A. These two troughs A and B are arranged, as shown at Fig. 2, out of line, and both communicate with a receptacle, C, the bottom of which is in the same plane with the bottom $b$ of the horizontal trough, the said receptacle being equal in width, as shown, to the aggregate widths of the two troughs A and B, and being sustained or supported by any suitable frame-work, D. Securely bolted to said frame-work at a proper elevation, nearly centrally over the receptacle C, are suitable stands or boxes, $e\,e$, in which is mounted to turn freely a shaft, E, which carries, as clearly shown, two chain-wheels or sprocket-wheels, $f$ and $g$, over which wheels run the adjacent ends of the two endless chains $h$, that are provided with the usual flights, $i$, one of said runs of chain with its flights running in an oblique direction and working immediately over and in connection with the ascending trough A, and the other one being arranged in a horizontal plane and having its flights run within the horizontal trough B.

Of course, the precise relative planes shown in which the two runs of chain travel, and in which the two runs of chain are located, is not material, and may be different from what is shown in the drawings. It is, however, essential that the two troughs should be more or less out of line, as shown in the plan view at Fig. 2, and that the ascending trough A should run into or unite with the receptacle C in about substantially the manner shown, for the purpose to be presently explained.

In the operation of a contrivance such as shown, and so far explained, the material to be conveyed or transported is brought up the oblique or ascending trough A in a well-known manner by means of the flights $i$ of the conveyer-chain combined with said trough, and is carried by said flights up to and somewhat beyond the point beneath the axis of the wheel $g$, on which one end of the conveyer-chain runs, and being thus conveyed the material is lodged within and piled up on the bottom of the receptacle C, and naturally spreads therein laterally, so as to be taken hold of by the flights of the horizontal run of carrier-chain which transports the material horizontally from the receptacle C into and thence along within the horizontal trough B. The inclosing flared side of the receptacle C that is nearest to the chain $g$ acts to confine laterally the stream of material brought up in the oblique trough A and carry or force it forwardly into the receptacle C, so that the accumulation of material thus brought up must slide or tumble laterally toward the horizontal run of chain, the flights of which take hold of the material and carry it forward into the trough B as fast as it may have been brought up and delivered by the obliquely-ascending run of flights.

It will be seen that in a conveyer-machine for translating the direction of movement of the material made, as shown and described, with the elevating or ascending trough running into a receptacle or enlargement, C, of the horizontal trough and following the two runs of chains and flights passing over wheels mounted on a common shaft, as specified, all the practical difficulties necessarily encountered in changing the direction of travel of the single run of conveyer-chains, as heretofore used, are entirely overcome and a conveyer apparatus for the purposes explained provided for use that is stronger, simpler, and more efficient in its practical working than any machine heretofore made that I know of.

What I claim as new, and desire to secure by Letters Patent, is—

In a conveyer machine or apparatus for conveying materials in different planes of travel, the combination of troughs which run in different planes, a receptacle or enlargement, C, with which said troughs communicate, and a double run of chain conveyers, the adjacent ends of which conveyers pass over wheels located or arranged side by side and substantially in line over the receptacle C, the whole constructed and operating substantially in the manner and for the purpose hereinbefore described.

In witness whereof I have hereunto set my hand this 7th day of August, 1886.

JAMES M. DODGE.

In presence of—
  H. J. KIELY,
  W. H. CLARKE.